Nov. 12, 1940.    C. A. DE GIERS    2,221,372
JOURNAL AND BEARING
Filed April 13, 1938

INVENTOR
CLARENCE A. DE GIERS
BY
*Cooper, Kerr & Dunham*
ATTORNEYS

Patented Nov. 12, 1940

2,221,372

UNITED STATES PATENT OFFICE 2,221,372

JOURNAL AND BEARING

Clarence A. de Giers, Long Island City, N. Y., assignor to The Liquidometer Corporation, Long Island City, N. Y., a corporation of Delaware Application April 13, 1938, Serial No. 201,663

2 Claims. (Cl. 308—120)

This invention pertains to journal bearings, and an object of the invention is to disclose a construction which will be self-cleaning in operation.

Need for such a device arises when the bearing is exposed to fluids having sticky, adhesive or viscous characteristics. Such conditions arise, for instance, in connection with float-actuated liquid-level indicating devices in tanks containing liquids of the kind described. Under such conditions it may happen that the bearing may stick and prevent the float from following the level of the liquid and thus give incorrect indications of the tank contents. Sticking may be prevented by making the journal bearings very loose, but that is impractical because then the readings of the instrument are inaccurate on account of excessive lost motion in the movement transmitting system.

The present invention provides a bearing which can be made a close fit and yet almost completely eliminate sticking of journals in their bearings.

Another field of usefulness of the present invention is in the spring shackles of automobiles, which are notorious for sticking, due to their accumulation of dirt and grit from the roads.

The invention contemplates the incorporation of scraping surfaces spaced around the circumference of either the journal or the bearing surface so that any rotary movement will automatically remove any adhesive material.

Further and other objects and advantages will be apparent from the specification and claims, and from the accompanying drawing which illustrates what is now considered the preferred embodiment of the invention.

Figure 1:
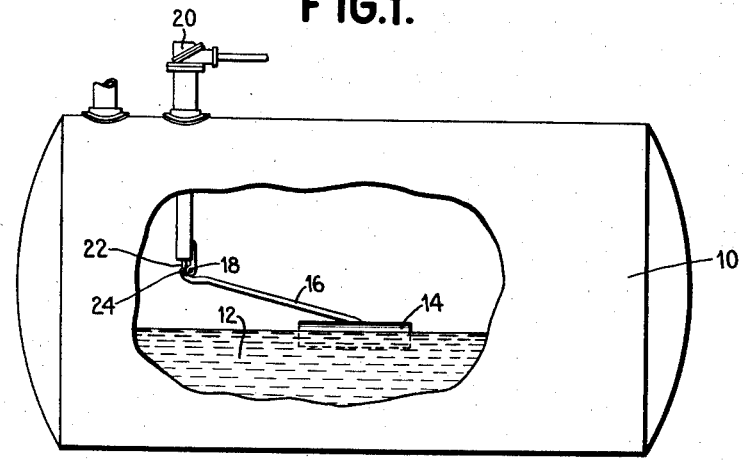
Fig. 1 shows the installation of a float-operated liquid-level indicator in a tank containing a liquid having sticky or viscous characteristics.
Figure 2:
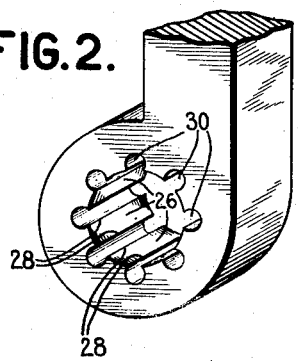
Fig. 2 is a detailed view in which the scraping elements are in the bearing instead of in the journal.

In Fig. 1 the tank 10 contains liquid 12 upon the surface of which rests a float 14 carried on an arm 16 fulcrumed at 18 and actuating an indicator 20 by means of vertical link 22 attached to the float-arm at 24. Whenever the tank is more than half full, the bearings 18 and 24 will be submerged and subject to gumming-up if the liquid be sticky or viscous. Under such conditions the bearings may, to advantage, be cut away at spaced intervals, as indicated at Fig. 2 in order to provide a plurality of spaced bearing surfaces 26, at each side of which is a scraping edge 28 effective to scrape the journal regardless of the direction of relative rotation of journal and bearing. The cutting away of the surface may be accomplished by drilling holes 30, with the drill so located that edges 28 will be acute so as to increase their effectiveness as scrapers.

Figure 3:
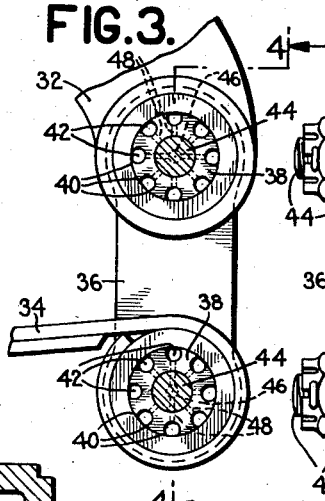
Fig. 3 illustrates the invention applied to spring shackles of an automobile, the scraping elements being in the journal instead of in the bearing.
Figure 4:
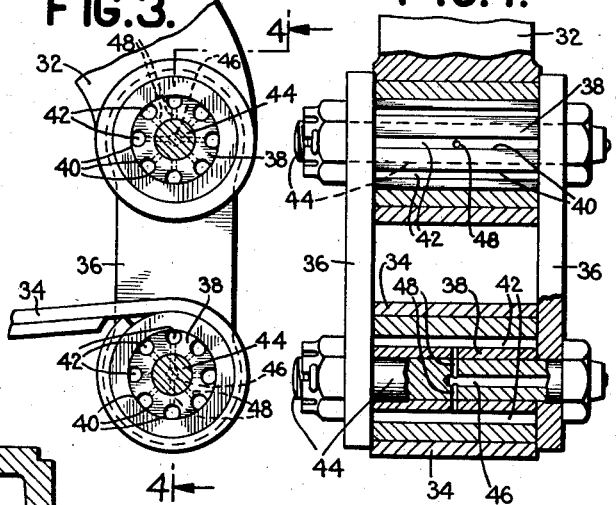
Fig. 4 is a cross-section on line 4—4 of Fig. 3.

Figs. 3 and 4 show the invention applied to spring shackles of an automobile. The automobile frame is designated 32, the spring is 34, the shackles are 36, and the shackle journals are 38. In this embodiment the scraping surfaces 40 are formed in the journals by drilling holes 42. The shackle bolts 44 are drilled for oil, as at 46, and radial holes 48 may be provided to conduct oil from passages 46 to cavities 42, thence to the rubbing surfaces.

Figure 5:
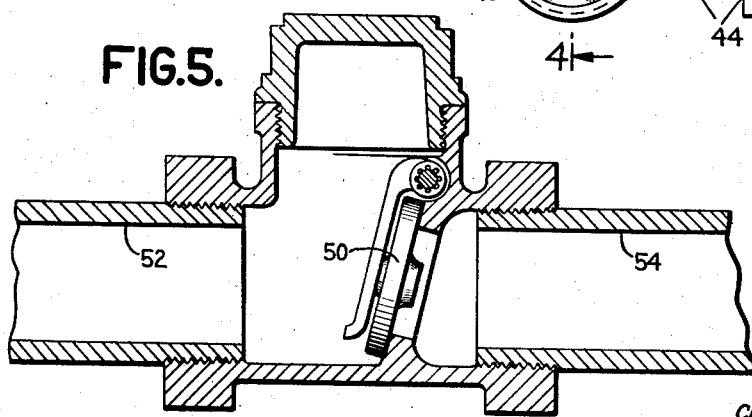
Fig. 5 illustrates the invention applied to a check valve for handling liquids.

Fig. 5 shows the use of the invention at the hinge of the check valve 50 used for preventing return of viscous liquid from pipe 52 to pipe 54. In this use, the scrapers are in the bearing surfaces as in Fig. 2, instead of in the journal, as in Figs. 3 and 4.

It is to be understood that the invention is not limited to the specific embodiment herein illustrated and described, but may be used in other ways without departure from its spirit as defined by the following claims.

I claim:

1. A bearing and a journal rotatable in said bearing, and longitudinal recesses so formed in the surface of said bearing as to provide acute spaced-apart relatively sharp scraping edges on said bearing for automatically scraping the surfaces of said journal when relative rotary movement of said journal and bearing occurs.

2. A bearing and a journal rotatable in said bearing, a plurality of longitudinal recesses so formed in the surface of said bearing as to provide acute spaced-apart relatively sharp longitudinal scraping edges on said bearing for automatically scraping the surfaces of said journal when relative rotary movement of said journal and said bearing occurs, and with adjacent acute scraping edges directed toward one another with the space therebetween forming a longitudinal open-ended passageway for the discharge therethrough of any scraped particles.

CLARENCE A. DE GIERS.